(12) United States Patent
Beskales et al.

(10) Patent No.: US 11,948,055 B1
(45) Date of Patent: Apr. 2, 2024

(54) METHODS AND COMPUTER PROGRAM PRODUCTS FOR CLUSTERING RECORDS USING IMPERFECT RULES

(71) Applicant: Tamr, Inc., Cambridge, MA (US)

(72) Inventors: George Anwar Dany Beskales, Waltham, MA (US); Nikolaus Bates-Haus, Littleton, MA (US); Ihab F. Ilyas, Waterloo (CA)

(73) Assignee: TAMR, INC., Cambridge, MA (US)

( * ) Notice: Subject to any disclaimer, the term of this patent is extended or adjusted under 35 U.S.C. 154(b) by 0 days.

(21) Appl. No.: 18/115,954

(22) Filed: Mar. 1, 2023

(51) Int. Cl.
*G06N 20/00* (2019.01)
*G06F 16/28* (2019.01)

(52) U.S. Cl.
CPC ........... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| | | | |
|---|---|---|---|
| 10,613,785 B1* | 4/2020 | Beskales | H03M 7/6023 |
| 11,049,028 B1* | 6/2021 | Beskales | G06F 16/285 |
| 2012/0278263 A1 | 11/2012 | Borthwick et al. | |
| 2021/0374164 A1* | 12/2021 | Ghoula | G06F 18/22 |
| 2023/0061746 A1* | 3/2023 | Wei | G06F 16/288 |

OTHER PUBLICATIONS

Lutz, Quentin, et al. "Active clustering for labeling training data." Advances in Neural Information Processing Systems 34 (2021): 8469-8480. (Year: 2021).*

Park, Sang-Hyeun, and Johannes Fürnkranz. "Efficient pairwise classification." Machine Learning: ECML 2007: 18th European Conference on Machine Learning, Warsaw, Poland, Sep. 17-21, 2007. Proceedings 18. Springer Berlin Heidelberg, 2007. (Year: 2007).*

* cited by examiner

*Primary Examiner* — Kevin W Figueroa
(74) *Attorney, Agent, or Firm* — Panitch Schwarze Belisario & Nadel LLP

(57) ABSTRACT

Record clustering is performed for a collection of records using training rules, training-rule labels, training data created from a sample of pairs of records, a pair-wise classifier, and a clustering algorithm. Record clustering is also performed for a collection of records using prediction rules, prediction-rule labels, a pair-wise classifier, and a clustering algorithm.

24 Claims, 11 Drawing Sheets

Workflow for record deduplication with supervised machine learning

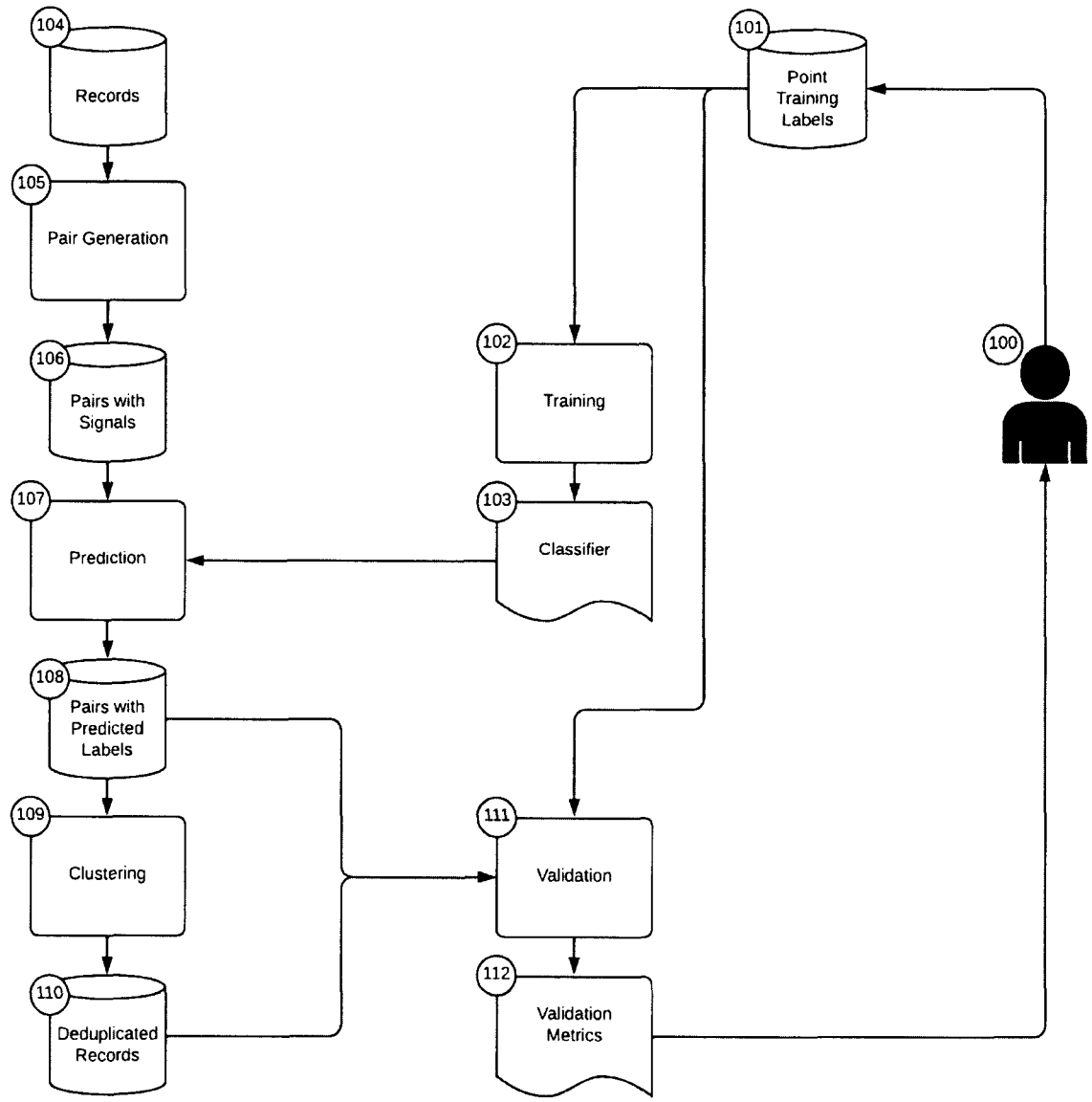
Figure 1: Workflow for record deduplication with supervised machine learning

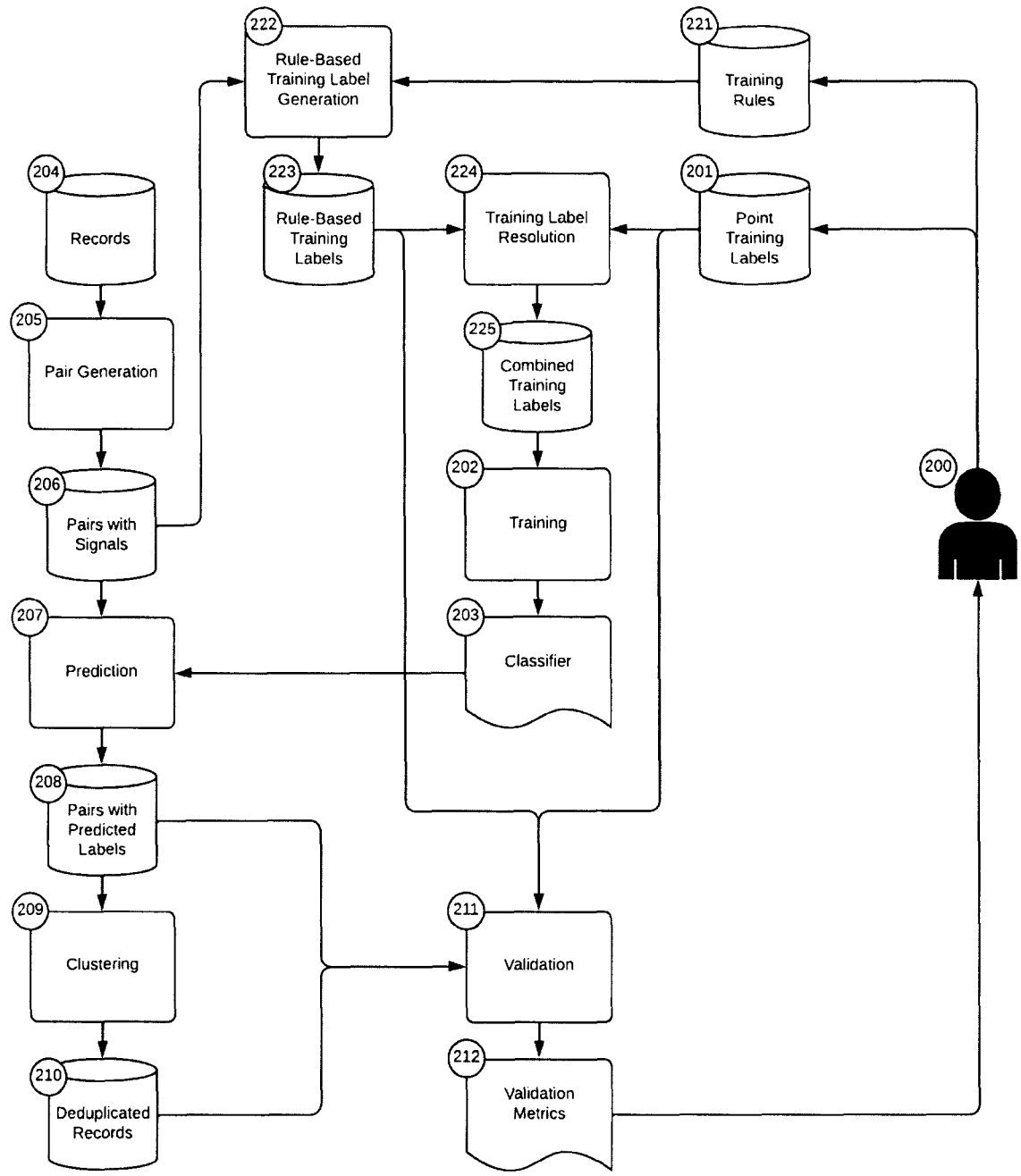
Figure 2: Workflow for record deduplication with supervised machine learning incorporating training rules

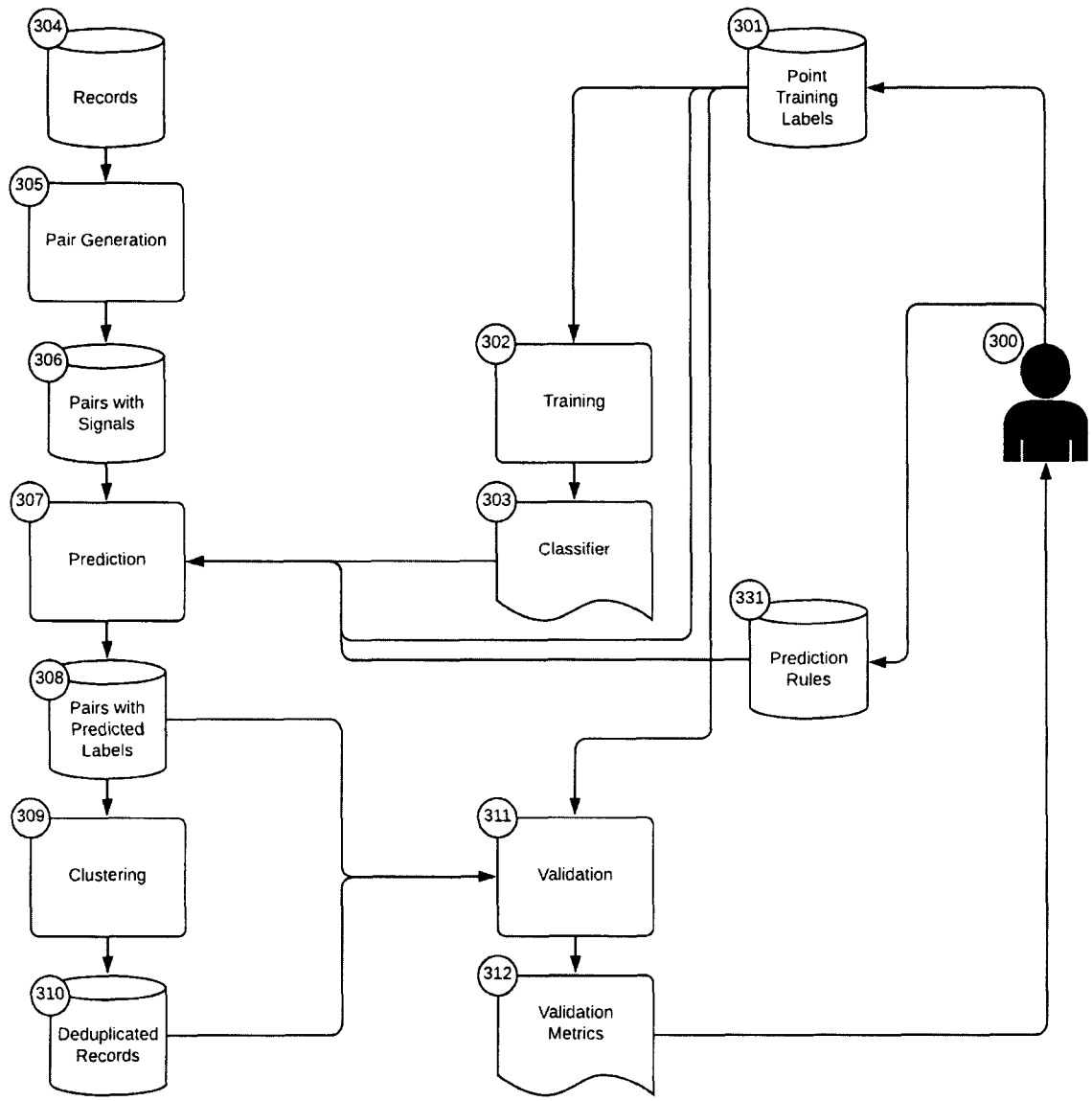
Figure 3: Workflow for record deduplication with supervised machine learning incorporating prediction rules

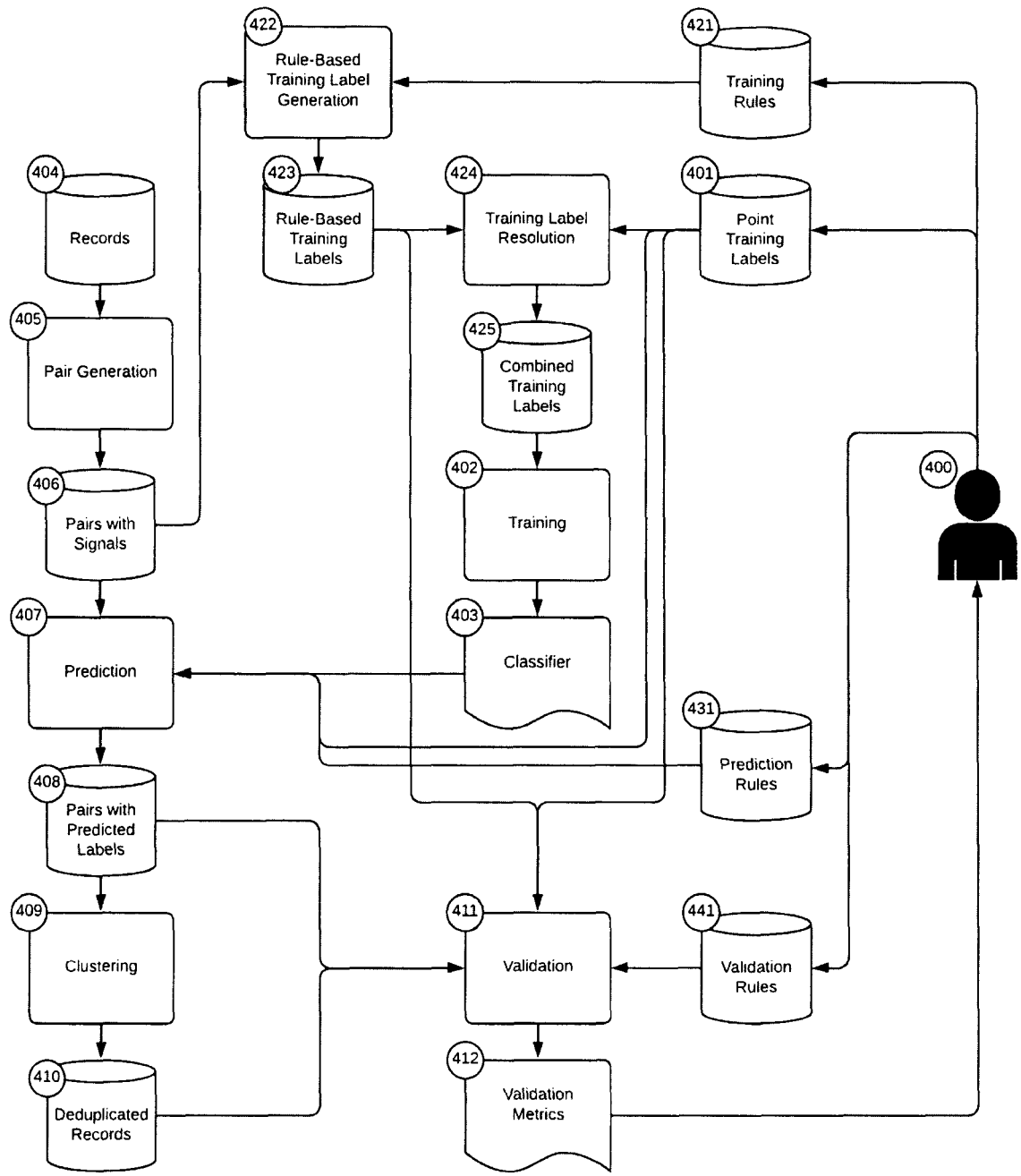
Figure 4: Workflow for record deduplication with supervised machine learning, with training rules, prediction rules, and validation rules

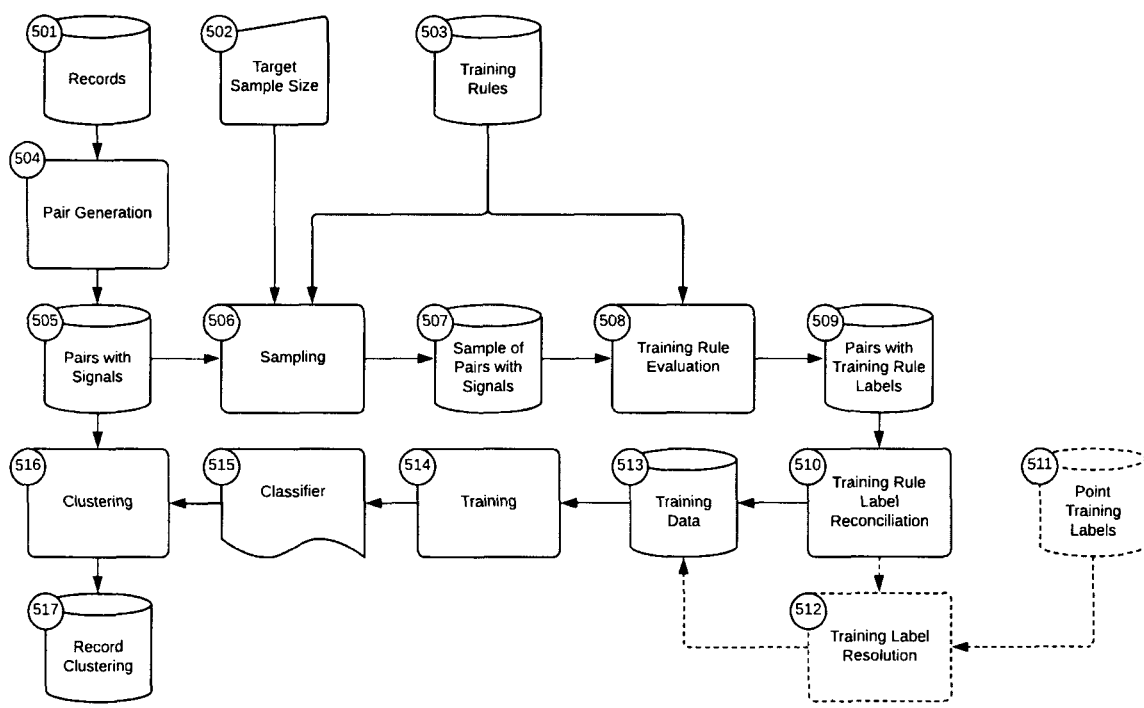
Figure 5A: Detailed workflow for record deduplication with supervised machine learning incorporating training rules

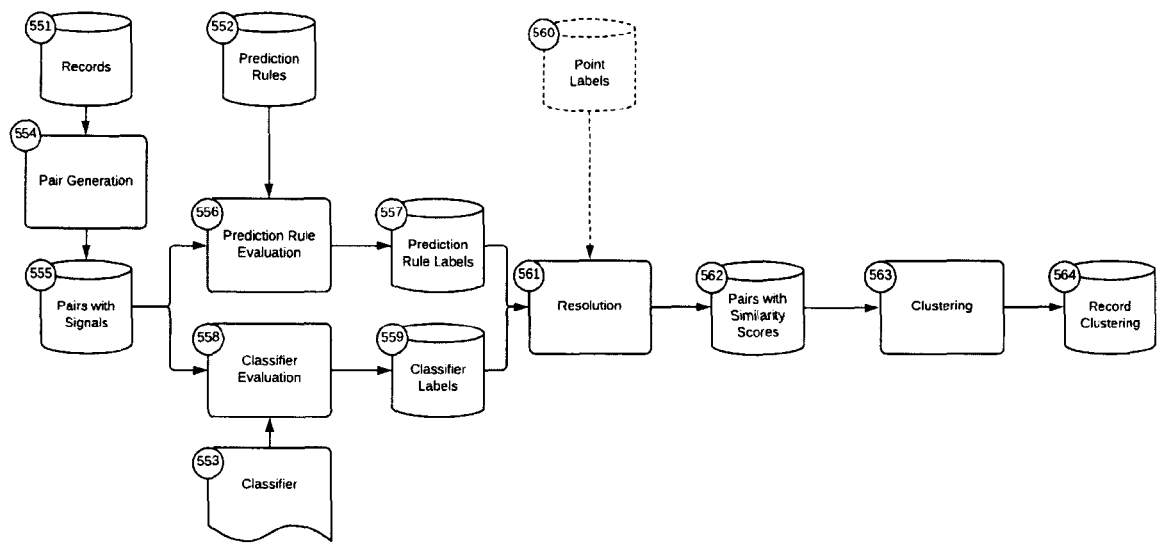
Figure 5B: Detailed workflow for record deduplication with supervised machine learning incorporating prediction rules

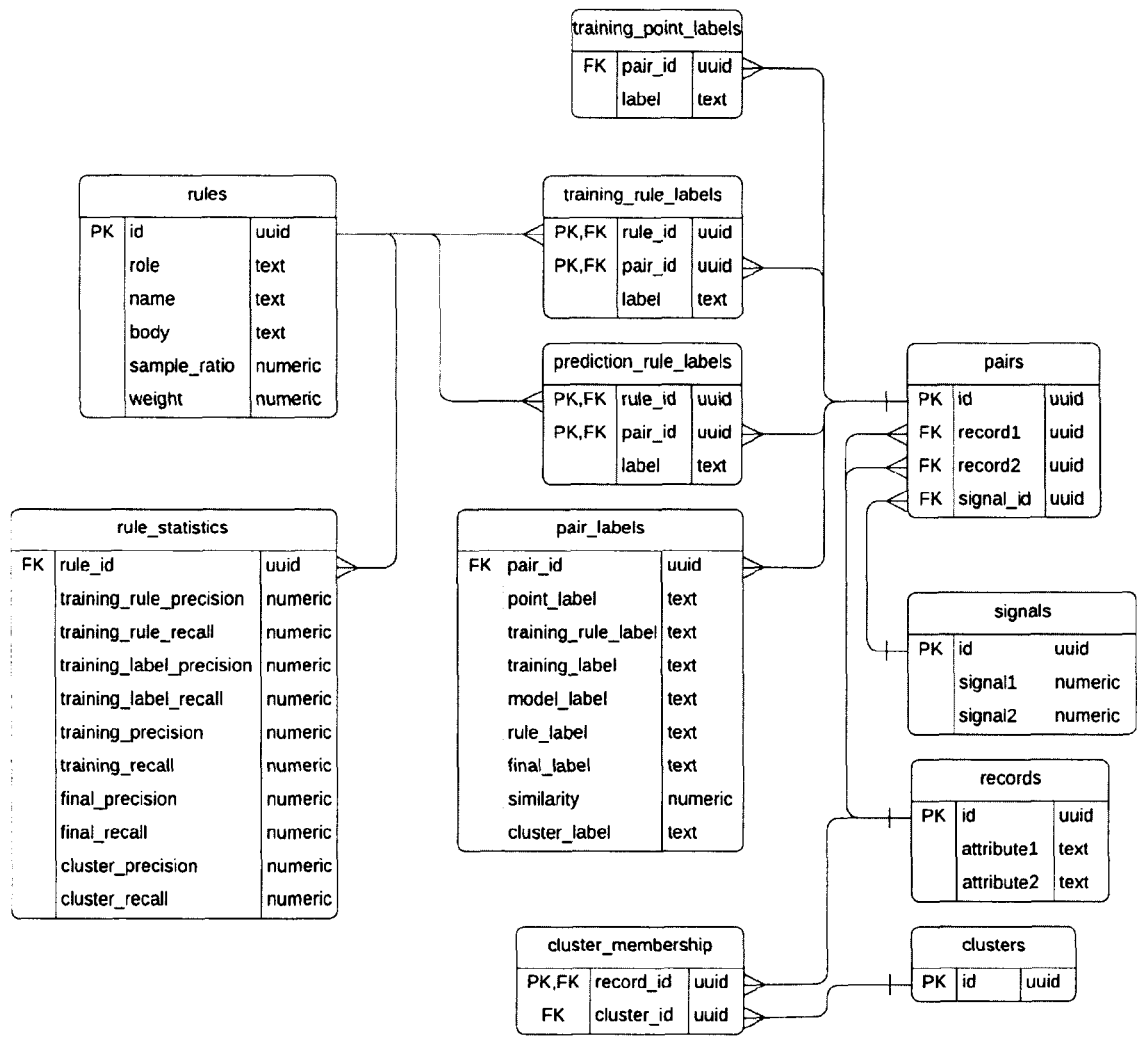
Figure 6: Entity-Relationship Diagram for the tables used in the workflow with rules

| Name | Address | City | State | Country | Age | Phone | email | Taxpayer ID |
|---|---|---|---|---|---|---|---|---|
| Alice Smith | 123 Main St. | Springfield | IL | USA | 33 | | | 12345 |
| Bob Smith | 123 Main St. | Springfield | IL | USA | 35 | 555-1212 | | 98765 |
| A. Smith | 123 Main St. | Springfield | IL | USA | | 555-1234 | a@example.com | 12345 |
| B. Smith | 123 Main St. | Springfield | IL | USA | 34 | | a@example.com | 98765 |
| Alice Smith | | | | | 34 | 555-1234 | a@example.com | 12345 |

Figure 7: Example records

```
CASE
WHEN record1->country = 'USA' AND
     record2->country = 'USA'
    THEN CASE
            WHEN signals->taxpayer_id = 1.0
                THEN 'MATCH'
            WHEN signals->taxpayer_id <> 1.0
                THEN 'NON_MATCH'
        END
END
```

Figure 8A: Rule USA_TAXPAYER

```
CASE
WHEN set_intersection(
        record1->email_addresses,
        record2->email_addresses
    ) IS NOT EMPTY
    THEN 'MATCH'
END
```

Figure 8B: Rule EMAIL_ADDRESS

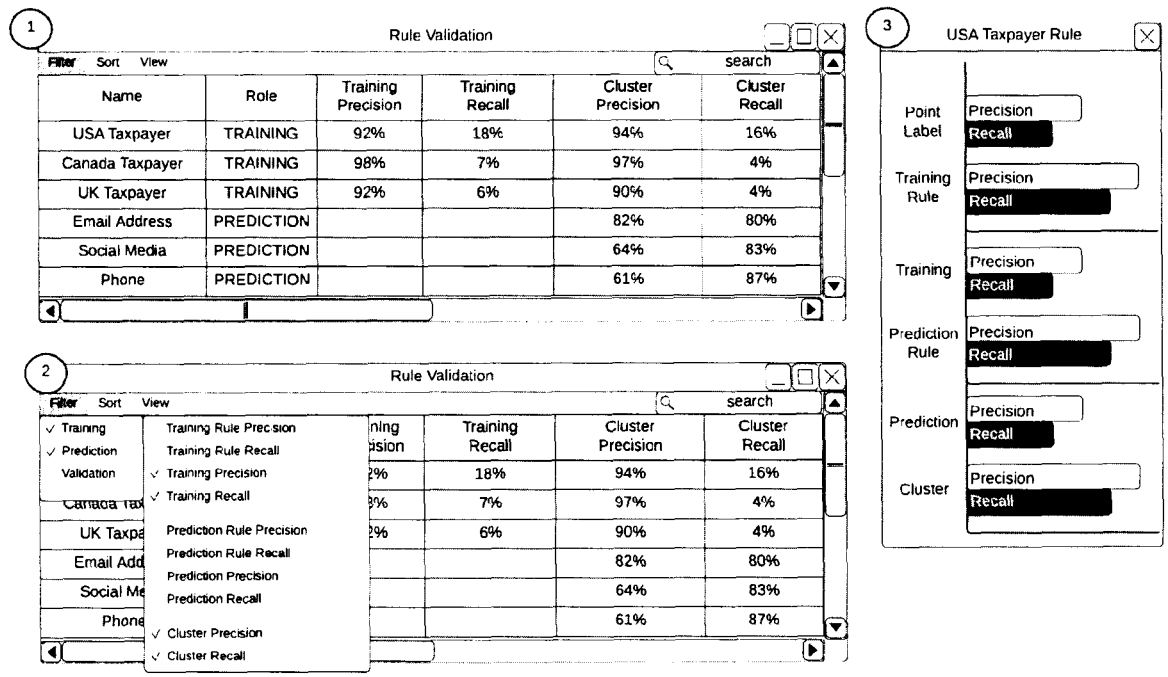
Figure 9A: User Interface for Rule Validation

| pair_id | record_id | USA Taxpayer | email Rule | Training Rule | ✓Cluster | country | taxpayer_id | email_address |
|---|---|---|---|---|---|---|---|---|
| (1,2) | 1 | ✓NON MATCH | | ✓NON MATCH | NON MATCH | USA | 12345 | |
| | 2 | | | | | USA | 98765 | |
| (2,3) | 2 | ✓NON MATCH | | ✓NON MATCH | NON MATCH | USA | 98765 | |
| | 3 | | | | | USA | 12345 | a@example.com |
| (3,4) | 3 | ✓NON MATCH | ×MATCH | ×MATCH | NON MATCH | USA | 12345 | a@example.com |
| | 4 | | | | | USA | 98765 | a@example.com |
| (4,5) | 4 | | ×MATCH | | NON MATCH | USA | 98765 | a@example.com |
| | 5 | | | | | | 12345 | a@example.com |
| (1,3) | 2 | ✓NON MATCH | | | NON MATCH | USA | 98765 | |
| | 3 | | | | | USA | 12345 | a@example.com |
| (2,4) | 2 | ×MATCH | | | NON MATCH | USA | 98765 | |
| | 4 | | | | | USA | 98765 | a@example.com |

Figure 9B: User Interface for Rule Labels

US 11,948,055 B1

METHODS AND COMPUTER PROGRAM PRODUCTS FOR CLUSTERING RECORDS USING IMPERFECT RULES

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

In the domain of data deduplication, deduplication of large-scale data (millions to billions of records) can be performed using machine learning. Previous efforts have shown how supervised machine learning can be trained using a training dataset composed of labeled positive and negative examples. Previous efforts have also shown how a trained machine learning model can be incorporated into an ensemble with rule-based models. However, there are still many aspects of data deduplication that can be improved so as to improve its efficiency. The present invention fulfills such a need.

BRIEF SUMMARY OF THE INVENTION

The present invention shows how to use rules to represent heuristic human knowledge alongside traditional labeled examples at multiple stages of the machine learning workflow. This has multiple benefits, as follows:

1. It is often more efficient for subject matter experts to represent heuristic knowledge as rules, rather than as a collection of point examples.
2. An initial machine learning model can be created using fewer rules than point examples.
3. Rules provide an additional way to train a classifier, to make predictions, and to validate classifier output against expectations.
4. Representing heuristic knowledge allows rules to be imperfect and contradictory without compromising the ability to train and validate a highly accurate machine learning model.
5. Management of large collections of heuristics used to train a supervised machine learning model does not require the kind of detailed management of rule priority and conflict resolution that is needed in traditional rule-based systems.

Systems and methods are described herein for incorporating heuristic human knowledge in the form of rules into a record deduplication workflow utilizing supervised machine learning.

BRIEF DESCRIPTION OF THE DRAWINGS

Preferred embodiments of the present invention will now be described by way of example with reference to the accompanying drawings:

FIGS. 1-4 are flowcharts for record deduplication with supervised machine learning in accordance with preferred embodiments of the present invention.

FIGS. 5A and 5B are detailed flowcharts depicting the use of rules in record deduplication with supervised machine learning as described in the claims.

FIG. 6 is an entity relationship diagram (ERD) in accordance with one preferred embodiment of the present invention.

FIG. 7 shows example records in accordance with one preferred embodiment of the present invention.

FIGS. 8A and 8B show example rules in accordance with preferred embodiments of the present invention.

FIGS. 9A and 9B show a user interface in accordance with one preferred embodiment of the present invention.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

This patent application includes an Appendix having a file named appendix689422-14US.txt created on Dec. 15, 2022 and having a size of 8,722 bytes. The Appendix is incorporated by reference into the present patent application. One preferred embodiment of the present invention is implemented via the source code in the Appendix. The Appendix is subject to the "Copyright Notice and Authorization" stated above.

The Appendix includes the following parts of software code:

Part 1: Pseudocode to generate rule-based training labels from training rules and pairs given a target sample size Part 2: Pseudocode to resolve conflicts in training-rule labels Part 3: Pseudocode to resolve rule-based training labels and point labels Part 4: Pseudocode to generate predicted labels with similarity given pairs, prediction rules, a classifier, and point labels

I. Terminology and Definitions

The following terminology and definitions are provided to promote understanding of the present invention. The terminology and definitions of the prior art are not necessarily consistent with the terminology and definitions of the present invention. Where there is conflict, the following terminology and definitions apply.

Records: Records consist of collections of (attribute, value) pairs, where the attribute is a name, and the value may be of a variety of types such as string, number, date, and the like. The attributes present on a record define its schema. One of the attributes of the record is used to identify the record. This attribute is referred to as the record ID. Typically, the records in a collection of records will have overlapping schema, but collections of records may also have heterogeneous schema so long as they share the same attribute as their record ID. No two records within a collection of records may have the same value for their record ID.

An example record collection might represent customers in a business-to-consumer commerce business, wherein each record has attributes representing demographic information about the customer, such as name, address, and age, and the record ID is a customer ID from, for example, a customer management system (CMS). FIG. 7 shows example records.

Pair of Records: A pair of records is two records from the same collection, associated with a pair ID. Unless otherwise specified, a "pair" refers to a pair of records. The order of the records in the pair does not matter, but in many practical systems an order must be specified. For these systems, to avoid creating redundant pairs (pairs containing the same two records but in a different order), a canonical ordering is specified, such as that the first record be the one with the record ID that sorts first lexicographically.

The pair has an identifier, referred to as the pair ID. Such an identifier can be issued by the system, or can be computed such as by hashing the record IDs of the two records in the pair.

Signals: A signal is a measure of similarity between two values. A pair with signals is a pair of records further augmented by a collection of signals. Each signal describes the similarity of the values of the corresponding attributes of the records in the pair. Typical signals include numeric difference, and TF*IDF weighted string similarity.

Pairs can also have other information associated with them, such as human labels, predicted labels, and the like.

Signals may handle NULLs in different manners. One option is for the signal to be NULL if either or both records have a NULL for the corresponding value. Another option is to assign distinct signal values, such as −0.5 and −1.0, for the cases where one or both records have a NULL for the corresponding value.

Rules: A rule takes as input a pair of records and produces a label for the pair. The expressions "produce a label for a pair" and "label a pair" are used interchangeably in this text. The rule can examine the values for attributes on the records and the signals for the pair. The label produced by the rule is MATCH, NON_MATCH, or NULL. MATCH indicates that the rule judges the two records to be a match; NON_MATCH indicates that the rule judges the two records to not be a match; and NULL indicates that the rule does not apply to the pair of records or is unable to judge whether they are a MATCH or NON_MATCH.

An example rule is the USA_TAXPAYER rule shown in FIG. 8A. This rule will produce a MATCH label for a pair when both records have country='USA' and the signal for taxpayer_id is 1.0 (indicating an exact match). If both records have country='USA' and the signal for taxpayer_id is not 1.0 (indicating that the records have different values), the rule produces a NON_MATCH label for the pair. If either record has something other than 'USA' for country, or if the signal for taxpayer_id is NULL, the rule produces NULL (it does not label the pair).

An example rule producing only MATCH or NULL is rule EMAIL_ADDRESS shown in FIG. 8B. This rule will produce a MATCH label for a pair when the records have at least one email_address in common. If they do not have an email address in common, including if either record has NULL email_address, the rule produces NULL.

Applicable Rule: A rule is applicable to a pair if it produces a non-NULL label for the pair. A pair has an applicable rule if there is some rule that produces a non-NULL label for the pair.

Over-Represented Rule: A rule is over-represented in a sample of pairs if the number of pairs with a non-NULL label provided by the rule is greater than a specified target sample size.

Under-Represented Rule: A rule is under-represented in a sample of pairs if the number of pairs with a non-NULL label provided by the rule is less than a specified target sample size.

Deduplicated Records: Records are considered de-duplicated when all records that refer to the same entity are labeled as such.

In some use cases, the results of the pairwise classifier can be used as deduplicated records: for a given record, all records in a pair with the given record, where the pair has a MATCH prediction, are considered to refer to the same entity.

In many use cases, however, clustering is required to resolve ambiguity and conflict in the pairwise MATCH predictions. For these use cases, records are considered to be deduplicated when all records that refer to the same entity are labeled as belonging to the same cluster.

II. Detailed Disclosure

A. Base Workflow for Record Deduplication with Supervised Machine Learning

Referring to FIG. 1, the workflow for record deduplication with supervised machine learning operates as follows:

1. An operator (100) provides point training labels (101), consisting of pairs of records with MATCH or NON_MATCH labels.

2. The point training labels (101) are used to train (102) a classifier (103) that will predict whether an input pair with signals should have a MATCH or NON_MATCH label, with a similarity score. The training can be performed using an existing method such as bootstrap aggregating, and the classifier can be of an existing type such as a random forest.

3. Pair generation (105) is performed on a collection of records (104), thereby producing pairs with signals (106). Pair generation can be performed using an existing method, such as described in U.S. Pat. No. 10,613,785 (Beskales et al.), which is incorporated by reference herein.

4. Prediction (107) is performed by applying the classifier (103) to each of the pairs with signals (106) to predict, for each of the pairs with signals, a label of MATCH or NON_MATCH, with a similarity score, thereby producing pairs with predicted labels (108).

5. Clustering (109) is performed on the pairs with predicted labels (108), using a technique such as weighted pair group method with arithmetic mean (WPGMA) to form deduplicated records (110).

6. Validation (111) compares the pairs with predicted labels (108), the deduplicated records (110), and the point training labels (101) to compute validation metrics (112), which may include precision, recall, and identification of pairs to be used for active learning.

There is also a learning cycle to augment the training labels that operates as follows:

1. The operator (100) uses the validation metrics (112) to determine how to adjust and/or augment the point training labels (101).

2. The workflow for deduplication with supervised machine learning can be repeated using the adjusted and/or augmented point training labels.

Workflow with Training Rules

The workflow described in FIG. 1 uses point training labels to train a classifier. This allows an operator to provide examples as point training labels, such that the classifier trained from the training labels will predict MATCH and NON_MATCH labels with high accuracy, e.g. 90% or greater, for pairs with signals that were not used for training.

At times, it is inconvenient to provide training as point training labels. This may be because users have heuristic knowledge that is not well represented as point training labels, or it may be because a large number of point labels must be provided to achieve the desired level of accuracy in the trained classifier.

There is a further challenge in that there are many extant, reliable machine learning methods, such as bootstrap aggregating, to train a classifier from point training labels, but there is no such extant, reliable machine learning method to train a classifier from heuristics.

Furthermore, rule-based systems that capture structural knowledge present the operator with the challenge to manually prioritize or otherwise address conflicting rules, which makes the development and maintenance of systems with hundreds or more rules cost-prohibitive.

A method is presented herein to generate rule-based training labels from pairs and potentially conflicting training rules, and a method is provided to combine these rule-based training labels with optional point training labels provided by a human operator. The resultant combined training labels can be used to train a classifier, thereby achieving the goal of training a classifier from heuristic knowledge, the goal of enabling heuristic knowledge to be expressed without requiring that conflicts between heuristics be explicitly resolved, and the goal of training a classifier from heuristic knowledge in combination with individually labeled examples.

Considerations for Training Rules

Building rule-based training labels needs to take the following into consideration:

1. There is a high cost to generating pairs. For example, if there is a rule that marks two records as a non-match if they differ on all attributes, a system would perform extremely poorly if it were to express this rule by generating all pairs where the records differ on all attributes (this is the majority of the $N^2$ pair space) and marking the resulting pairs as NON_MATCH.

2. Rules differ in the number of pairs that they label. For example, a rule that matches users based on their user ID on a social media site with a small user base will label many fewer pairs than a rule that matches users based on address, since all users will have an address. Unless this is balanced somehow, training will be biased to favor the labels produced by rules that label more pairs.

3. More than one rule may produce a label for a given pair, and these labels may conflict. These conflicts must be accommodated somehow for effective training so that the operator does not need to provide manual conflict resolution such as explicit rule prioritization.

4. Rules and point training labels may both provide labels for a given pair, and these labels may conflict. These conflicts must be accommodated somehow for effective training so that the operator does not need to provide manual conflict resolution.

B. Workflow for Record Deduplication with Supervised Machine Learning Incorporating Training Rules Referring to FIG. 2, in another embodiment of the present invention, the workflow for record deduplication with supervised machine learning incorporating training rules operates as follows:

1. An operator (200) provides training rules (221) and associated configuration. The operator may optionally also provide point training labels (201) as in the base workflow.

2. Pair generation (205) is performed on a collection of records (204), thereby producing a collection of pairs with signals (206).

3. Rule-based training label generation (222) uses the pairs with signals (206) and the collection of training rules (221) to produce rule-based training labels (223), each rule-based training label being a pair with either a MATCH or a NON_MATCH label.

4. Training label resolution (224) resolves any conflicts between the point training labels (201) and the rule-based training labels (223), thereby producing combined training labels (225), each combined training label being a pair with either a MATCH or a NON_MATCH label.

5. The combined training labels (225) are used to train (202) a classifier (203) that will predict whether an input pair with signals should have a MATCH or NON_MATCH label, with a similarity score.

6. Prediction (207) is performed by applying the classifier (203) to each of the pairs with signals (206) and predicting, for each of the pairs with signals, a label of MATCH or NON_MATCH, with a similarity score, thereby producing pairs with predicted labels (208).

7. Clustering (209) is then performed on the pairs with predicted labels (208) to produce deduplicated records (210).

8. Validation (211) examines the pairs with predicted labels (208), the deduplicated records (210), the point training labels (201), and the rule-based training labels (223) to compute validation metrics (212), which may include precision, recall, and identification of pairs to be used for active learning.

There is also a learning cycle to augment the training rules and training labels that operates as follows:

1. The operator (200) examines the validation metrics (212) to determine how to adjust and/or augment the training rules (221) and point training labels (201).

2. The workflow for deduplication with supervised machine learning incorporating training rules, can be repeated using the adjusted and/or augmented training rules and point training labels.

Detailed Description of Steps in the Workflow

Referring to FIG. 5A, in one embodiment of the present invention, the detailed workflow for record deduplication with supervised machine learning incorporating training rules operates as follows:

A collection of records (501), a target sample size (502), and a collection of training rules (503) are provided to the system by an operator.

Pairs Used in Rule-Based Training Label Generation

Pair generation (504) is performed on the collection of records (501) to produce pairs with signals (505). So that pairs can be generated only once to support the entire workflow, the collection of pairs with signals that is input to the training rules is the same collection of pairs with signals that is input to prediction. Assume an efficient method for generating pairs, such as is described in the above-mentioned U.S. Pat. No. 10,613,785. This satisfies consideration 1, namely, the high cost of generating pairs. Each pair has the following structure:

pair_id—an identifier for the pair. This can be, for example, a hash of the two record identifiers.

record1—one of the two records in the pair. For stability, this can be, for example, the record in the pair with the record_id that sorts first lexicographically.

record2—the other of the two records in the pair. For stability, this can be, for example, the record in the pair with the record_id that sorts last lexicographically.

signals—for each attribute in record1 or record2, the collection of signals contains a measure of the similarity of the values in the corresponding attributes. The similarity function is determined per-attribute. For example, for the attribute 'description' a TF*IDF-weighted cosine similarity function might be used, whereas for the attribute 'age' a numerical difference function might be used.

By using the same pairs for prediction and rule-based training label generation, one can ensure that the introduction of training rules does not dramatically alter the performance of the system with respect to pair generation.

Rule-Based Training Label Generation

It is desirable to have a collection of rule-based training labels that is sufficiently large to allow training a classifier with high accuracy, but not so large as to incur excessive compute or storage costs. Furthermore, it is desirable that the number of pairs labeled by each rule is not skewed towards more generally applicable rules, since this would result in biased training data and result in a biased classifier that tends to predict the labels of more generally applicable rules. To accomplish these goals, the pairs with non-NULL labels from each rule are sampled (506). It is important that this sampling be done in a stable manner, such that on successive training rounds—when the data may have changed, the rules may have changed, and/or the pairs may have changed—the sampled output of the rule should be as similar as practical to the sampled output used in the previous round, while still reflecting the changes. This minimizes the risk of re-sampling introducing changes in training data that are not reflective of changes in the source data, rules, or method of pair generation. The sampling method should furthermore reduce the number of rules that are over-represented or under-represented in the sample. A rule is over-represented if there are more than the target sample size number of pairs in the sample with a non-null label for the rule. A rule is under-represented if there are fewer than the target sample size number of pairs in the sample with a non-null label for the rule. What follows is a description of an approach to producing a stable sample (507) that is close to the specified target sample size and is simultaneously balanced across rules by minimizing under-represented rules and reducing over-represented rules.

1. Start with an empty sample, a pair count of 0 for each rule, and a target sample size for the rule-based training labels.

2. Evaluate the rules on pairs in a stable order, for example, in ascending order of pair_id. Note that if pair_id is a hash of the IDs of the records in the pair this will result in processing pairs in a stable random order. A rule that produces a non-NULL label for the pair is termed an applicable rule. For each pair with at least one applicable rule:

a. Examine the pair count for each applicable rule, that is, the number of pairs in the sample with non-NULL labels for the rule.

b. If at least one pair count for an applicable rule is below the target sample size, this indicates that the rule is under-represented in the sample. The pair is added to the sample with the labels generated by all applicable rules, and the pair count for each applicable rule is incremented.

c. If there are no under-represented rules (all rules have at least as many labels as the desired sample size), or there are no additional pairs, then stop evaluating rules on pairs.

3. Examine the pairs in the sample, in the same order as step 2. For each pair in the sample:

a. Examine the pair count for each applicable rule. If the pair count for all applicable rules is above the target sample size, the pair is labeled only by rules that are over-represented in the sample and it can be considered a redundant pair. The pair is removed from the sample, and the pair count for each applicable rule is decremented.

c. If there are no over-represented rules for the sample (all rules have at most as many labels as the desired sample size), or there are no additional pairs in the sample, then stop evaluating pairs in the sample.

4. The result (507) is a sample of pairs with training-rule labels that is close to the target sample size, while ensuring that each rule is represented either by its entire result or by at least the requested number of pairs. In this embodiment, all training rules have been evaluated (508) on the pairs in the sample during the sampling process, thus each pair in the sample is a pair with one or more training-rule labels (509).

The number of pairs sampled for an individual rule can optionally be increased or decreased to allow a human operator to emphasize or de-emphasize that rule in training. This is done by associating sample ratios with rules, and the pair count for the rule is scaled by the sample ratio prior to determining whether the rule is under- or over-represented in the sample.

Example

Consider the records in Table 1:

TABLE 1

| record_id | country | taxpayer_id | email_address |
|---|---|---|---|
| 1 | USA | 12345 | |
| 2 | USA | 98765 | |
| 3 | USA | 12345 | a@example.com |
| 4 | USA | 98765 | a@example.com |
| 5 | | 12345 | a@example.com |

For this example, consider all pairs of the records: (1,2), (1,3), (1,4), (1,5), (2,3), (2,4), (2,5), (3,4), (3,5) and (4,5). The signal for taxpayer_id (used by the USA_TAXPAYER rule) is 1.0 if the two records have the same non-NULL value, is 0.0 if the two records have different non-NULL values, and is NULL otherwise.

These pairs will be labeled by the rules as follows in Table 2:

TABLE 2

| pair_id | USA_TAXPAYER | EMAIL_ADDRESS |
|---|---|---|
| (1, 2) | NON_MATCH | |
| (1, 3) | MATCH | |
| (1, 4) | NON_MATCH | |
| (1, 5) | | |
| (2, 3) | NON_MATCH | |
| (2, 4) | MATCH | |
| (2, 5) | | |
| (3, 4) | NON_MATCH | MATCH |
| (3, 5) | | MATCH |
| (4, 5) | | MATCH |

Given a target sample size of 2, these pairs are considered in order of ascending pair id. Start with an empty sample, and the counts for USA_TAXPAYER and EMAIL_ADDRESS is [0, 0].

Considering the pair (1,2), only the rule USA_TAXPAYER is applicable and has count <2, so the pair is added to the sample. The sample is {(1,2)}, and the counts are [1, 0].

Considering the pair (1,3) only the rule USA_TAXPAYER is applicable and has count <2, so the pair is added to the sample. The sample is {(1,2), (1,3)} and the counts are [2, 0].

Considering pair (1, 4), only the rule USA_TAXPAYER is applicable, but it has count >=2, so the pair is not added to the sample. The sample and counts remain unchanged.

Considering pair (1,5), it has no applicable rules so it is skipped.

Considering pairs (2,3) and (2,4), only the rule USA_TAXPAYER is applicable, but it has count >=2, so the pair is not added to the sample. The sample and counts remain unchanged.

Considering pair (2,5), it has no applicable rules so it is skipped.

Considering pair (3, 4), both the rule USA_TAXPAYER and the rule EMAIL_ADDRESS are applicable. The rule EMAIL_ADDRESS has count <2, so the pair is added to the sample. The sample is {(1, 2), (1, 3), (3, 4)} and the counts are [3, 1].

Considering pair (3,5), the rule EMAIL_ADDRESS is applicable and has count 2, so the pair is added to the sample. The sample is {(1, 2), (1, 3), (3, 4), (3, 5)} and the counts are [3, 2].

There are no under-represented rules, so this phase is stopped. Rule USA_TAXPAYER has count >2, so at least one rule is over-represented, so the pairs in the sample are again considered in order of ascending pair id.

Considering the pair (1, 2), only the rule USA_TAXPAYER is applicable and has count >2, so it is over-represented. All applicable rules are over-represented, so the pair is redundant and is removed from the sample. The sample is {(1,3), (3, 4), (3, 5)} and the counts are [2, 2].

No rule is over-represented so this phase is stopped.

The result is a sample containing 3 pairs, wherein each rule is applicable to two pairs.

If a sample ratio of 1.5 were applied to the rule USA_TAXPAYER, then the target sample size would be 1.5*2=3. When the pair (1, 4) is considered in the first phase, the rule USA_TAXPAYER would not be over-represented (2<3), so (1, 4) would be added to the sample. When reviewing the sample in the second phase, when considering the pair (1, 2), only the rule USA_TAXPAYER is applicable and the rule would have count >3, so (1, 2) would be removed from the sample. The final sample would be {(1, 3), (1, 4), (3, 4), (3, 5)} and the counts would be [3, 2].

As discussed above, a representative example of pseudo-code to create rule-based training labels is shown in Part 1 of the Appendix.

Reconciling Conflicts in Training-Rule Labels

When multiple rules are applicable to a given pair, their labels may conflict. To reconcile (510) these conflicts, examine the evidence for MATCH and for NON_MATCH for the pair to determine the reconciled training-rule label. The most straightforward method to reconcile conflicting labels is to count the number of rules generating each non-NULL label and select the label with the higher count as the rule-based training label. This has been found to be an effective method, especially when breaking ties in favor of MATCH, as this emphasizes recall and supports the active learning process.

Conflict reconciliation can optionally be weighted for or against some rules to allow a human to emphasize or de-emphasize rules in conflict resolution. The operator may associate a weight in the range [0, 1] with each rule. When examining evidence for MATCH and for NON_MATCH to determine the reconciled training-rule label, compute the sum of the weights for the rules generating each label and select the label with the larger sum as the rule-based training label. Again, in the event of a tie, it has been found that breaking ties in favor of a MATCH label emphasizes recall and supports the active learning process, so one breaks ties in favor of MATCH.

Note that the rule weight is independent of rule sample ratio. In experiments, it has been found that sample ratio corresponds to breadth of applicability (recall) of a rule, and rule weight corresponds more to the accuracy (precision) of the rule, and therefore it is necessary to specify these independently.

By reconciling conflicts in training-rule labels in the sampled pairs, a sample of pairs is produced with one label each, thereby producing rule-based training labels. In the absence of point training labels, these rule-based training labels can serve directly as training data (513).

Example

In the above example, the pair (3, 4) has conflicting labels from the rule USA_TAXPAYER and the rule EMAIL_ADDRESS. Since there is one label each for MATCH and NON_MATCH, break the tie in favor of MATCH and label the pair as MATCH.

If the rule EMAIL_ADDRESS were given a weight of 0.75, indicating that email address is a less reliable indicator of match than other rules, then the weights would be 1 for NON_MATCH and 0.75 for MATCH, resulting in a rule-based training label of NON_MATCH.

As discussed above, a representative example of pseudo-code to reconcile conflicts in training-rule labels is shown in Part 2 of the Appendix.

Training Label Resolution

If point training labels (511) are also provided to the system then the training labels used to train the classifier are formed by resolving (512) the rule-based training labels and point training labels.

It may occur that the label for a pair in the rule-based training labels conflicts with the label for the same pair in the point training labels provided by the operator. In the event of such a conflict, assume that the point label represents detailed knowledge that the rules fail to capture, and therefore retain only the point label in the combined training labels (513). These conflicts are very interesting as part of validation, and are discussed below in the section on validation. If a pair in the sample of pairs with rule-based training labels has no conflicting point label, then the rule-based training label is retained in the combined training labels. Likewise, if a pair in the point labels has no conflicting rule-based training label, then the point label is retained in the combined training labels.

As discussed above, a representative example of pseudo-code to resolve rule-based training labels and point labels is shown in Part 3 of the Appendix.

The result is combined training labels, or training data, which are used to train (514) a classifier (515) to predict labels for pairs.

Refreshing Rule-Based Training Labels

There are several conditions that warrant refreshing the rule-based training labels, as follows:
1. When the rules change, such as when a rule is added or removed, or the logic of a rule is changed, or the target sample size changes, or rule sample ratios or rule weights are changed;
2. When the pairs change, such as when adding or removing records, or changing the way pairs are generated;
3. When the signals on pairs change, such as when changing the configuration of signal functions;

4. When the collection of training labels from human subject matter experts change, and any conflicts between those labels and rule-based labels need to be re-examined.

In any of these cases, the current sample of rule-based training labels can be discarded (or archived for governance or comparison purposes), and the rule-based training label method re-run to generate a new sample. Because pair ids are stable across all these changes, and because the sampling method will tend to select the same pairs from run to run, the sample will show changes proportional to the changes being reflected.

Prediction

In this workflow for record deduplication with supervised machine learning with training rules, pairs are generated as the first step of building rule-based training labels. By ensuring that rule-based training labels and prediction work off the same pairs, the prediction part of the workflow can work from the same pairs, and pairs do not need to be regenerated. Therefore, prediction applies the trained classifier to the already generated pairs, and the workflow proceeds as in the base workflow until validation.

Clustering

In the workflow for record deduplication with supervised machine learning with training rules, clustering (516) is performed as in the base workflow without training rules. The result of clustering is deduplicated records (517).

Validation

In the workflow for record deduplication with supervised machine learning incorporating training rules, the operator may wish to repeat the learning cycle of the workflow to augment the training rules and point training labels in order to improve the accuracy of the model. There are several types of label introduced by the workflow incorporating training rules, and comparing these labels against each other can inform modifications to the training to benefit this learning cycle. FIG. 9B presents an example of a user interface that an operator could use to examine the labels produced by rules. Such labels include:

1. The labels predicted by individual training rules (item 1 in FIG. 9B);
2. The rule-based training labels (item 2 in FIG. 9B);
3. The combined training labels.

Each of these can be compared with the others, and with the labels produced by the base workflow (item 3 in FIG. 9B), including the point training labels and the labels predicted by the model. The comparisons (represented by the checks and crosses in FIG. 9B) can be used in detail as well as in aggregate. FIG. 9A presents an example of a user interface that an operator could use to examine aggregate metrics about rule performance, showing (1) a tabular view of rule performance, showing for each rule the fraction of pairs it labels (recall) and the fraction of its labels that agree (precision) as compared to training labels, cluster labels, or other labels. (2) shows the ability to filter to different subsets of the rules, sort results by different metrics, and change which metrics are viewed. (3) shows a visual representation of performance for an individual rule.

Some examples can help to clarify:

1. The operator examines the cases where different training rules provide different labels for rule-based training labels, alongside the final rule-based training label for those pairs. This may show that some rules are labeling some pairs inaccurately, which could be addressed by narrowing the scope of the rule (adding to the conditions in the rule) or by reducing the weight of the rule.
2. The operator examines the aggregate statistics of how often a training rule agrees or disagrees with the final label. If a rule disagrees often, but the operator believes that the label provided by the rule is often correct, this could be addressed by increasing the sample ratio for the rule. If a rule agrees often, but the operator believes that the label provided by the rule is often incorrect, this could be addressed by decreasing the sample ratio for the rule.
3. The operator examines the cases where there is conflict between rule-based labels and point training labels. If the rule-based training labels are often incorrect, this may indicate a missing rule. It may also indicate that there are cases that cannot be correctly labeled by rules, which can be addressed by adding point training labels for these cases.

When examining the accuracy of a rule, it is interesting to examine both in-sample and out-sample or overall accuracy, meaning that it is interesting to examine both the performance of the rule within the scope of the sample of rule-based training labels, and the performance of the rule on all pairs, not restricted to the scope of the sample of rule-based training labels.

To perform validation, the labels of each individual rule as well as the rule-based label are retained. For out-sample accuracy, the label of each individual rule as well as a rule-based label are computed for all pairs, not just the pairs in the sample of rule-based training labels. This can be done once for all pairs and the labels used during rule-based training label sampling, eliminating the need to compute the label of each individual rule and rule-based labels during sampling.

When performing prediction on the pairs, all but cluster-based summary accuracy metrics can be computed simultaneously.

Computation of cluster-based accuracy metrics requires a cluster-based label. A cluster-based label is generated by examining the records in each pair and labeling the pair MATCH if the records are in the same cluster, and NON_MATCH otherwise. As cluster-based labels are computed, cluster-based summary accuracy metrics can be computed simultaneously.

The result is a validation dataset with a variety of metrics, which a user interface can use to provide the operator with the ability to filter and summarize, and update training rules and training labels as described above, resulting in adjusted and/or augmented training rules and point training labels.

The workflow for deduplication with supervised machine learning incorporating training rules can then be repeated using the adjusted and/or augmented training rules and point training labels.

C. Workflow for Deduplication with Supervised Machine Learning Incorporating Prediction Rules Workflow Summary Referring to FIG. 3, in another embodiment of the present invention, the workflow for record deduplication with supervised machine learning incorporating prediction rules operates as follows:

1. An operator (300) provides point training labels (301), consisting of pairs of records with MATCH or NON_MATCH labels.
2. The point training labels (301) are used to train (302) a classifier (303) that will predict whether an input pair with signals should have a MATCH or NON_MATCH label, with a similarity score.
3. The operator (300) provides prediction rules (331) and associated configuration.

4. Pair generation (305) is performed on a collection of records (304), thereby producing a collection of pairs with signals (306).

5. Prediction (307) is performed by applying the classifier (303) and the prediction rules (331) to each of the pairs with signals (306), and incorporating the point training labels (301), and predicting, for each of the pairs with signals, a label of MATCH or NON_MATCH, with a similarity score, thereby producing pairs with predicted labels (308).

6. Clustering (309) is performed on the pairs with predicted labels (308) to produce deduplicated records (310).

7. Validation (311) compares the pairs with predicted labels (308), the deduplicated records (310), and the training labels (301) to compute validation metrics (312), which may include precision, recall, and identification of pairs to be used for active learning.

There is also a learning cycle to augment the prediction rules and/or training labels which operates as follows:

1. The operator (300) uses the validation metrics (312) to determine how to adjust and/or augment the prediction rules (331) and/or point training labels (301).

2. The workflow for deduplication with supervised machine learning incorporating prediction rules can be repeated using the adjusted and/or augmented prediction rules and/or point training labels.

Considerations for Using Rules in Prediction

Generally, use of rules in training and/or validation is sufficient to support the workflow for deduplication with supervised machine learning, but there are use cases that are better met by using rules to directly generate the predicted labels for pairs. For example, industry regulations may require that certain cases be handled certain ways. These types of cases are best expressed directly as rules, rather than by trying to train the classifier to learn to handle them.

Rules can be incorporated into predicted labels for pairs. Doing so needs to take the following into consideration:

1. More than one rule may label a given pair, and these labels may conflict. These conflicts must be accommodated somehow to determine a final prediction.

2. The learned model and the rules may both label a given pair, and these labels may conflict. These conflicts must be accommodated somehow to determine a final prediction.

3. Rules and point training labels may both label a given pair, and these labels may conflict. These conflicts must be accommodated somehow to determine a final label.

4. The output of pairwise prediction is used in clustering, which uses a similarity score. The final label needs to have a similarity score for clustering, even when this label has been predicted by rules.

The method for using rule-based predicted labels is as follows.

DETAILED DESCRIPTION

Referring to FIG. 5A, in one embodiment of the present invention, the detailed workflow for record deduplication with supervised machine learning incorporating training rules operates as follows:

Most of the workflow is unchanged from the base case when rules are not used, the exceptions being that the operator provides rules, prediction incorporates rules and point training labels, validation incorporates rules, and the operator may update rules as part of the learning cycle.

A collection of records (551), a collection of prediction rules (552), and a pairwise classifier (553) are provided by an operator. Point labels (560) may optionally also be provided.

Pair generation (554) is performed on the collection of records (551) to produce pairs with signals (555).

Prediction Using a Learned Classifier in Combination with Prediction Rules

The classifier (553) is evaluated on each pair to predict a classifier label and similarity score for the pair. The prediction rules (552) are also evaluated (556) on each pair to produce prediction-rule labels for the pair. The pair then has predictions from each of the prediction rules (557) and a prediction from the classifier (559). The pair may also have a point training label (560) provided by the operator.

Resolving Conflicts Between Rules

When multiple rules label a given pair, they may conflict in the label they predict. To resolve (561) these conflicts, provide each rule with a weight in the range [0, 1], then take the sum of the weights for MATCH and NON_MATCH and select the label with the larger sum. In the event of a tie, using a MATCH label emphasizes recall and supports the active learning process, so ties are broken in favor of MATCH. The result is a rule-based label for the pair.

Conflicts between prediction rules are very interesting as part of validation; this is discussed in the section on validation.

Resolving Conflicts Between Rule-Based Labels and the Classifier Labels

When both the rules and the learned classifier generate a prediction for a given pair, assume that the rules represent human knowledge that is not captured by the learned classifier, and therefore use only the label predicted by the rules.

These conflicts are very interesting as part of validation. This is discussed in the section on validation.

Resolving Conflicts Between Rule-Based Labels and Point Labels

In the event that the rule-based label conflicts with a point training label, assume that the point training label represents detailed knowledge that the rules fail to capture, and therefore use only the point training label.

These conflicts are very interesting as part of validation. This is discussed in the section on validation.

Computing Similarity Scores

When offered the ability to use rules for training and validation (see the section on the combined workflow, below), it has been found that users use very few rules in prediction, and that these rules have very high confidence. Therefore, one can assign a similarity score of 1.0 to any pair with a 'MATCH' rule-based label, and a similarity score of 0.0 to any pair with a 'NON_MATCH' rule-based label. Likewise, point labels can be assigned a similarity score of 1.0 for a 'MATCH' label, and a similarity score of 0.0 for a 'NON_MATCH' label. If a pair has neither a rule-based label nor a point label, the similarity score provided by the classifier is used. The result is a similarity score for each pair (562).

An alternative is to use a weighted average prediction for pairs with rule-based labels: sum the weights of the rules predicting 'MATCH', and the negative weights of the rules predicting 'NON_MATCH', then divide the result by the number of rules offering predictions to get a value in the range [−1.0, 1.0]. Then divide by 2 and add 0.5 to obtain a score in the range [0, 1] to use for similarity for pairs with rule-based labels.

Example

Considering the example records given above in Table 1, the rules USA_TAXPAYER and EMAIL_ADDRESS used as prediction rules, and an arbitrary model, the results of model- and rule-based prediction are as shown in Table 3:

TABLE 3

| pair_id | USA TAXPAYER | EMAIL ADDRESS | model_label | final_label | similarity |
|---|---|---|---|---|---|
| (1, 2) | NON_MATCH | | NON_MATCH | NON_MATCH | 0.0 |
| (1, 3) | MATCH | | MATCH | MATCH | 1.0 |
| (1, 4) | NON_MATCH | | MATCH | NON_MATCH | 0.0 |
| (1, 5) | | | MATCH | MATCH | 0.6 |
| (2, 3) | NON_MATCH | | NON_MATCH | NON_MATCH | 0.0 |
| (2, 4) | MATCH | | NON_MATCH | MATCH | 1.0 |
| (2, 5) | | | NON_MATCH | NON_MATCH | 0.3 |
| (3, 4) | NON_MATCH | MATCH | MATCH | MATCH | 1.0 |
| (3, 5) | | | MATCH | MATCH | 0.8 |
| (4, 5) | | | MATCH | MATCH | 0.5 |

As discussed above, a representative example of pseudocode to generate predicted labels with similarity given pairs, prediction rules, a classifier, and point labels is shown in Part 4 of the Appendix.

Clustering

The pairs with similarity scores (562) are clustered (563) using a standard clustering algorithm, such as Weighted Pair Group Method with Arithmetic Mean (WPGMA) using the pair similarity score to compute the distance metric, and the clustered records are presented as the deduplicated records (564).

Validation

In the workflow for record deduplication with supervised machine learning incorporating prediction rules, the operator may wish to perform the learning cycle of the workflow to augment the prediction rules and point training labels in order to improve the accuracy of the system. There are several types of label introduced by the workflow incorporating prediction rules, and comparing these labels to each other can inform modifications to the prediction rules and point training labels to benefit the learning cycle. Such labels include:

1. The labels predicted by individual prediction rules;
2. The rule-based predicted labels;
3. The final predicted labels.

Each of these can be compared with the others, and with the labels produced by the base workflow, including the point training labels and the labels predicted by the classifier. The comparisons can be used singly as well as in aggregate.

Some examples can help to clarify:

1. The operator examines the cases where different prediction rules provide different labels for the same pair, alongside the final label for those pairs. This may show that a rule is labeling some pairs inaccurately, which could be addressed by narrowing the scope of the rule (e.g., by modifying the conditions of the rule) or, if using rule weights, by reducing the weight of the rule.

2. The operator examines the aggregate statistics of how often a prediction rule agrees or disagrees with the final label. If a rule disagrees often, but the operator believes the rule is often correct, this could be addressed by narrowing the scope of conflicting rules or, if using weights, by increasing the weight of the rule. If a rule agrees often, but the operator believes that the label provided by the rule is often incorrect, this could be addressed by narrowing the scope of the rule (modifying the conditions of the rule) or, if using rule weights, by reducing the weight of the rule.

3. The operator examines the cases where there is conflict between rule-based predicted labels and classifier-based predictions. If the rule-based predicted labels are often incorrect, this may indicate a missing rule. It may also indicate that there are cases that cannot be correctly labeled by rules, which can be addressed by adding point training labels for these cases.

To perform validation, the labels of each individual prediction rule, as well as the rule-based and classifier-based label, are retained. This can be done once for all pairs, and all metrics other than cluster-based summary metrics can be computed simultaneously.

Computation of cluster-based metrics requires a cluster-based label. A cluster-based label is generated by examining the records in each pair and labeling the pair MATCH if the records are in the same cluster, and NON_MATCH otherwise. As cluster-based labels are computed, cluster-based summary metrics can be computed simultaneously.

The result is a validation dataset with a variety of metrics, which a user interface can use to provide the operator with the ability to filter and summarize, and update prediction rules and point training labels as described above.

If active learning is used, then when identifying pairs to be used in active learning, those pairs that are labeled by rules are removed from consideration, since they are labeled by rules and not by the learned classifier.

The workflow for deduplication with supervised machine learning incorporating prediction rules can then be repeated using the adjusted and/or augmented prediction rules and point training labels.

D. Combined Workflow for Record Deduplication with Supervised Machine Learning Incorporating Training Rules, Prediction Rules, and Validation Rules Referring to FIG. 4, in another embodiment of the present invention, the workflow for record deduplication with supervised machine learning, with training rules, prediction rules, and validation rules operates as follows:

1. An operator (400) provides point training labels (401), training rules (421) and associated configuration including target sample size, prediction rules (431) and associated configuration, and validation rules (441) and associated configuration.

2. Pair generation (405) is performed on a collection of records (404), producing a collection of pairs with signals (406).

3. Rule-based training label generation (422) uses the pairs with signals (406) and the training rules (421) and associated configuration to produce rule-based training labels (423).

4. Training label resolution (424) resolves any conflicts between rule-based training labels (423) and point training labels (401), resulting in combined training labels (425).

5. The combined training labels (425) are used to train (402) a classifier (403) that will predict whether an input pair with signals should have a MATCH or NON_MATCH label, with a similarity score.

6. Prediction (407) is performed by applying the classifier (403) and the prediction rules (431) and associated configuration to each of the pairs with signals (406), and incorporating the point training labels (401), and predicting, for each of the pairs with signals, a label of MATCH or NON_MATCH, with a similarity score, thereby producing pairs with predicted labels (408).

7. Clustering (409) is done on the pairs with predicted labels (408) to form deduplicated records (410).

8. Validation (411) compares the combined training labels (425), the pairs with predicted labels (408), the deduplicated records (410), and the labels provided by the validation rules (441) and associated configuration to compute validation metrics (412) to be used by the operator in tuning the system.

There is also a learning cycle to augment the training labels, training rules, prediction rules, and/or validation rules which operates as follows:

1. The operator (400) uses validation metrics (412) to determine how to adjust and/or augment the point training labels (401), training rules (421) and associated configuration, prediction rules (431) and associated configuration, and/or validation rules (441) and associated configuration.

2. The workflow for deduplication with supervised machine learning incorporating training rules, prediction rules, and validation rules can be repeated using the adjustments.

Considerations for the Combined Workflow

The combined workflow follows the structure of the workflow incorporating training rules, with augmented prediction and validation steps as described by their respective workflows. The combined workflow is the straightforward integration of the previously described workflows as follows:

1. Pair generation and training is done as described in the workflow incorporating training rules, resulting in pairs with signals (406), combined training labels (425), and a trained classifier (403).

2. Prediction is done as described in the workflow incorporating prediction rules, resulting in pairs with predicted labels (408).

3. Validation rules are evaluated on pairs to produce validation labels to be used evaluating rule performance, contributing to metrics (412), which also includes metrics for rule-based training labels and rule-based predictions.

E. Entity Relationships

FIG. 6 is a self-explanatory Entity Relationship Diagram (ERD) that supports the combined workflow. More specifically, FIG. 6 shows the ERD for the tables used in the workflow with rules.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

The scope of the present invention thus further includes a tangible computer program product for record clustering, wherein the computer program product comprises non-transitory computer-readable media encoded with instructions for execution by a processor to perform the methods described above.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of record clustering comprising:
    (a) providing:
        (i) a collection of records,
        (ii) a collection of training rules for training a pair-wise classifier, wherein each training rule takes as input a pair of records from the collection of records, with accompanying signals, and produces a training-rule label, the training-rule label being one of a match label, or a non-match label, or a null label, and
        (iii) a target sample size;
    (b) generating pairs of records with accompanying signals from the collection of records;
    (c) producing training data by:
        (i) selecting a sample of the pairs of records with accompanying signals, the size of the sample being at least the target sample size,
        (ii) evaluating each training rule in the collection of training rules on each pair of records with accompanying signals in the sample to produce a training-rule label, thereby producing a collection of pairs of records with a plurality of training-rule labels, and
        (iii) reconciling the plurality of training-rule labels on each pair of records in the collection of pairs of records with a plurality of training-rule labels to produce a rule-based training label for each pair of records in the collection of pairs of records, thereby producing training data, the training data including pairs of records with rule-based training labels;
    (d) training, using a machine learning training method, a pair-wise classifier using the training data; and
    (e) generating, using a clustering algorithm, a clustering for the collection of records using the pairs of records with accompanying signals and the pair-wise classifier, thereby producing a record clustering.

2. The method of claim 1 further comprising:
    (f) generating validation metrics from the collection of training rules, the pair-wise classifier, the pairs of records with accompanying signals, and the record clustering, the validation metrics being presented to an operator in a user interface display.

3. The method of claim 2 wherein step (f) further uses validation rules provided by an operator, wherein each validation rule takes as input a pair of records from the collection of records, with accompanying signals, and produces a match label, non-match label, or null label; and generating validation metrics from the collection of training rules, the pair-wise classifier, the pairs of records with accompanying signals, the record clustering, and the validation rules, the validation metrics being presented to an operator in a user interface display.

4. The method of claim 1 wherein step (c)(i) of selecting a sample of the pairs of records with accompanying signals is performed by:

(A) computing, for each pair of records with accompanying signals, the hash of the IDs of the two records in the pair as the pair ID;
    (B) starting with an empty sample;
    (C) evaluating each training rule in the collection of training rules on each of the pairs of records with accompanying signals in order by pair ID to produce training-rule labels for the pair of records with accompanying signals, and adding the pair of records with accompanying signals to the sample if any rule producing a non-null label for the pair of records with accompanying signals is under-represented in the sample; and
    (D) examining the pairs of records with accompanying signals in the sample in order of pair ID and removing the pair of records with accompanying signals from the sample if all rules producing a non-null label for the pair of records with accompanying signals are over-represented in the sample,
    the pairs of records with accompanying signals remaining in the sample being the selected sample of pairs of records with accompanying signals.

5. The method of claim 4 wherein selecting a sample of the pairs of records with accompanying signals further incorporates sample ratios for the training rules.

6. The method of claim 1 wherein step (c)(iii) further incorporates rule weights.

7. The method of claim 1 wherein step (c) further uses point training labels provided by an operator, and the reconciling training-rule labels further reconciles the training-rule labels with the point training labels so provided, thereby producing the training data.

8. A computer program product for record clustering, wherein the computer program product comprises non-transitory computer-readable media encoded with instructions for execution by a computer processor to perform a method of:
    (a) providing:
        (i) a collection of records,
        (ii) a collection of training rules for training a pair-wise classifier, wherein each training rule takes as input a pair of records from the collection of records, with accompanying signals, and produces a training-rule label, the training-rule label being one of a match label, or a non-match label, or a null label, and
        (iii) a target sample size;
    (b) generating pairs of records with accompanying signals from the collection of records;
    (c) producing training data by:
        (i) selecting a sample of the pairs of records with accompanying signals, the size of the sample being at least the target sample size,
        (ii) evaluating each training rule in the collection of training rules on each pair of records with accompanying signals in the sample to produce a training-rule label, thereby producing a collection of pairs of records with a plurality of training-rule labels, and
        (iii) reconciling the plurality of training-rule labels on each pair of records in the collection of pairs of records with a plurality of training-rule labels to produce a rule-based training label for each pair of records in the collection of pairs of records, thereby producing training data, the training data including pairs of records with rule-based training labels;
    (d) training, using a machine learning training method, a pair-wise classifier using the training data; and (e) generating, using a clustering algorithm, a clustering for the collection of records using the pairs of records with accompanying signals and the pair-wise classifier, thereby producing a record clustering.

9. The computer program product of claim 8 wherein the instructions for execution by the computer processor further cause the computer processor to:
(f) generate validation metrics from the collection of training rules, the pair-wise classifier, the pairs of records with accompanying signals, and the record clustering, the validation metrics being presented to an operator in a user interface display.

10. The computer program product of claim 9 wherein step (f) further uses validation rules provided by an operator, wherein each validation rule takes as input a pair of records from the collection of records, with accompanying signals, and produces a match label, non-match label, or null label; and generating validation metrics from the collection of training rules, the pair-wise classifier, the pairs of records with accompanying signals, the record clustering, and the validation rules, the validation metrics being presented to an operator in a user interface display.

11. The computer program product of claim 8 wherein step (c)(i) of selecting a sample of the pairs of records with accompanying signals is performed by:
(A) computing, for each pair of records with accompanying signals, the hash of the IDs of the two records in the pair as the pair ID;
(B) starting with an empty sample;
(C) evaluating each training rule in the collection of training rules on each of the pairs of records with accompanying signals in order by pair ID to produce training-rule labels for the pair of records with accompanying signals, and adding the pair of records with accompanying signals to the sample if any rule producing a non-null label for the pair of records with accompanying signals is under-represented in the sample; and
(D) examining the pairs of records with accompanying signals in the sample in order of pair ID and removing the pair of records with accompanying signals from the sample if all rules producing a non-null label for the pair of records with accompanying signals are over-represented in the sample,
the pairs of records with accompanying signals remaining in the sample being the selected sample of pairs of records with accompanying signals.

12. The computer program product of claim 11 wherein selecting a sample of the pairs of records with accompanying signals further incorporates sample ratios for the training rules.

13. The computer program product of claim 8 wherein step (c)(iii) further incorporates rule weights.

14. The computer program product of claim 8 wherein step (c) further uses point training labels provided by an operator, and the reconciling training-rule labels further reconciles the training-rule labels with the point training labels so provided, thereby producing the training data.

15. A method of record clustering comprising:
(a) providing:
(i) a collection of records,
(ii) a collection of prediction rules, wherein each prediction rule takes as input a pair of records from the collection of records, with accompanying signals, and produces a prediction-rule label, the prediction-rule label being one of a match label, or a non-match label, or a null label;
(iii) a pair-wise classifier that takes as input a pair of records from the collection of records, with accompanying signals, and produces a match label with a similarity score or a non-match label with a similarity score;
(b) generating pairs of records with accompanying signals from the collection of records;
(c) producing pairs of records with similarity scores by:
(i) evaluating the prediction rules in the collection of prediction rules on each pair of records with accompanying signals to produce prediction-rule labels,
(ii) evaluating the pair-wise classifier on each pair of records with accompanying signals to produce classifier labels with similarity scores, and
(iii) reconciling the prediction-rule labels and the classifier labels with similarity scores to produce pairs of records with similarity scores; and
(d) generating, using a clustering algorithm, a clustering for the collection of records using the pairs of records with similarity scores, thereby producing a record clustering.

16. The method of claim 15 further comprising:
(e) generating validation metrics from the collection of prediction rules, the pair-wise classifier, the pairs of records with accompanying signals, and the record clustering, the validation metrics being presented to an operator in a user interface display.

17. The method of claim 16 wherein step (e) further uses validation rules provided by an operator, wherein each validation rule takes as input a pair of records from the collection of records, with accompanying signals, and produces a match label, non-match label, or null label; and generating validation metrics from the collection of prediction rules, the pair-wise classifier, the pairs of records with accompanying signals, the record clustering, and the validation rules, the validation metrics being presented to an operator in a user interface display.

18. The method of claim 15 wherein step (c) (iii) further incorporates rule weights.

19. The method of claim 15 wherein step (c) further uses point labels provided by an operator, and reconciling the prediction-rule labels and the classifier labels further reconciles prediction-rule labels and classifier labels with the point labels so provided, thereby producing the pairs of records with similarity scores.

20. A computer program product for record clustering, wherein the computer program product comprises non-transitory computer-readable media encoded with instructions for execution by a computer processor to perform a method of:
(a) providing:
(i) a collection of records,
(ii) a collection of prediction rules, wherein each prediction rule takes as input a pair of records from the collection of records, with accompanying signals, and produces a prediction-rule label, the prediction-rule label being one of a match label, or a non-match label, or a null label;
(iii) a pair-wise classifier that takes as input a pair of records from the collection of records, with accompanying signals, and produces a match label with a similarity score or a non-match label with a similarity score;

(b) generating pairs of records with accompanying signals from the collection of records;

(c) producing pairs of records with similarity scores by:
  (i) evaluating the prediction rules in the collection of prediction rules on each pair of records with accompanying signals to produce prediction-rule labels,
  (ii) evaluating the pair-wise classifier on each pair of records with accompanying signals to produce classifier labels with similarity scores, and
  (iii) reconciling the prediction-rule labels and the classifier labels with similarity scores to produce pairs of records with similarity scores; and (d) generating, using a clustering algorithm, a clustering for the collection of records using the pairs of records with similarity scores, thereby producing a record clustering.

21. The computer program product of claim 20 wherein the instructions for execution by the computer processor further cause the computer processor to:
  (e) generate validation metrics from the collection of prediction rules, the pair-wise classifier, the pairs of records with accompanying signals, and the record clustering, the validation metrics being presented to an operator in a user interface display.

22. The computer program product of claim 21 wherein step (e) further uses validation rules provided by an operator, wherein each validation rule takes as input a pair of records from the collection of records, with accompanying signals, and produces a match label, non-match label, or null label; and generating validation metrics from the collection of prediction rules, the pair-wise classifier, the pairs of records with accompanying signals, the record clustering, and the validation rules, the validation metrics being presented to an operator in a user interface display.

23. The computer program product of claim 20 wherein step (c) (iii) further incorporates rule weights.

24. The computer program product of claim 20 wherein step (c) further uses point labels provided by an operator, and reconciling the prediction-rule labels and the classifier labels further reconciles prediction-rule labels and classifier labels with the point labels so provided, thereby producing the pairs of records with similarity scores.

* * * * *